E. M. DOWDY.
CULTIVATOR.
APPLICATION FILED JULY 18, 1910.
976,854.
Patented Nov. 29, 1910.
2 SHEETS—SHEET 1.
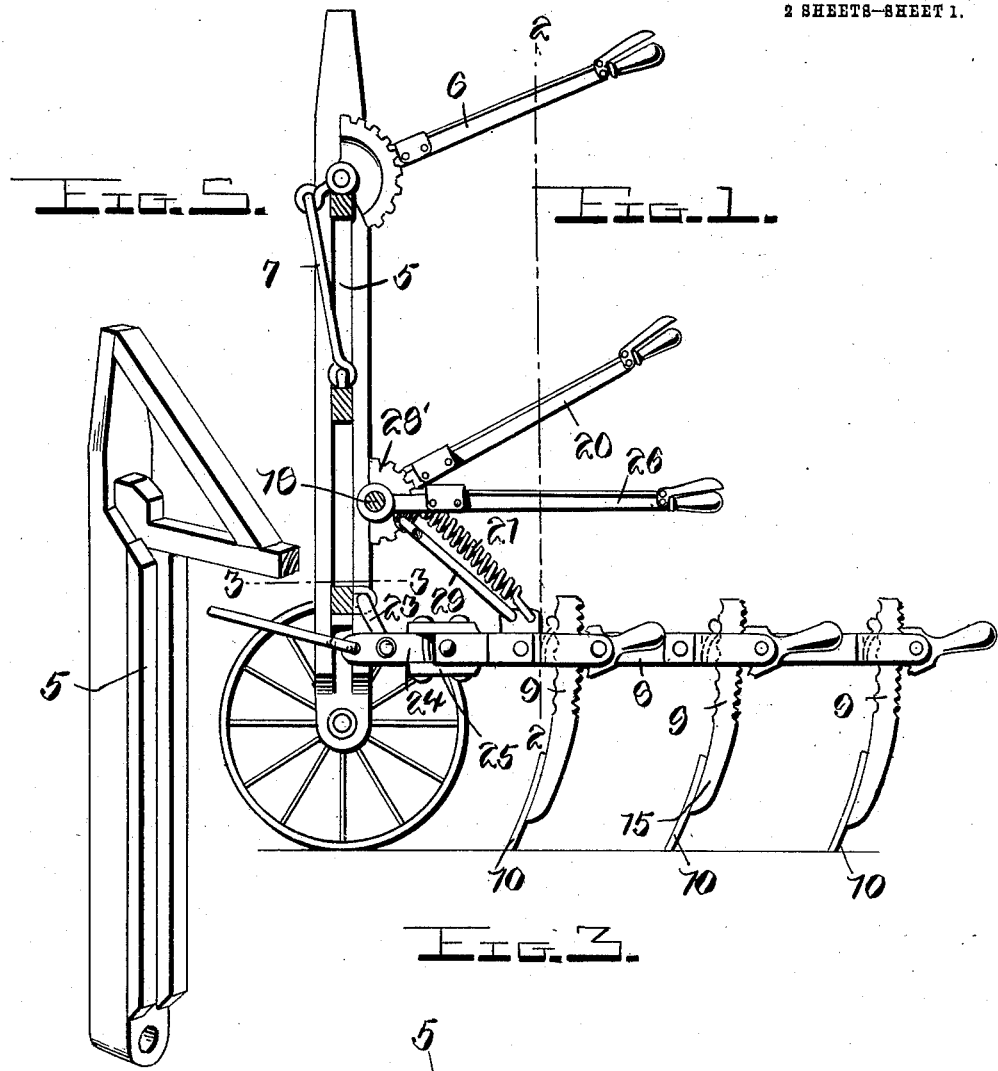

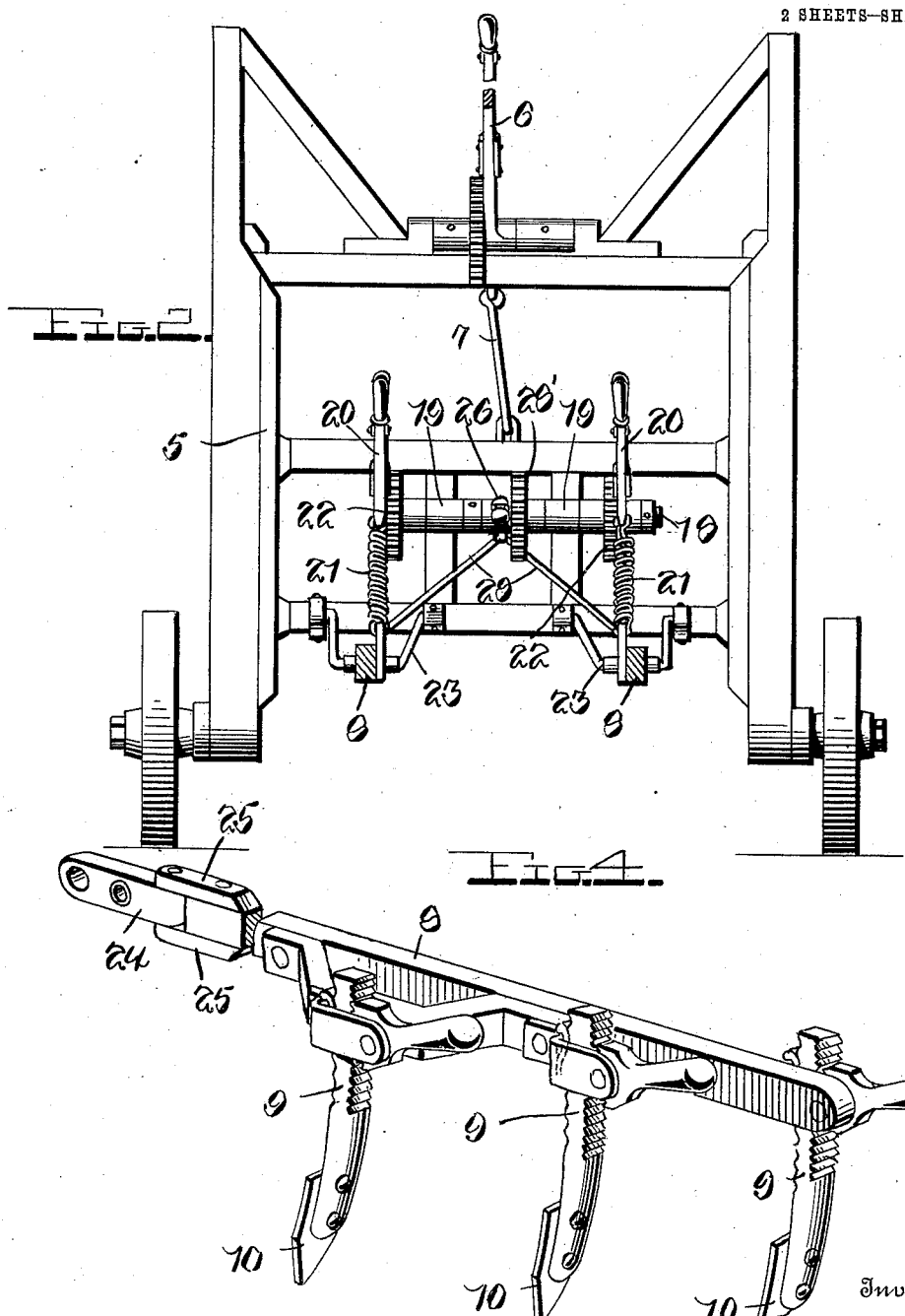

UNITED STATES PATENT OFFICE.

EWELL MONROE DOWDY, OF WATER VALLEY, TEXAS.

CULTIVATOR.

976,854.   Specification of Letters Patent.   Patented Nov. 29, 1910.

Original application filed April 2, 1910, Serial No. 553,146. Divided and this application filed July 18, 1910.
Serial No. 572,593.

*To all whom it may concern:*

Be it known that I, EWELL MONROE DOWDY, a citizen of the United States, residing at Water Valley, in the county of Tom Green and State of Texas, have invented certain new and useful Improvements in Cultivators, of which the following is a specification, reference being had to the accompanying drawings.

This invention relates to improvements in cultivators and more particularly to improved means for mounting and adjusting the cultivator teeth carrying bars for use in connection with a seed planting machine of that character shown and described in my prior application for patent filed April 2, 1910, Serial Number 553,146; and of which this application is a division.

The primary object of the present invention is to provide means for mounting the cultivator bars upon the vertically movable frame shown and described in the above identified application whereby they may either be adjusted independently of the frame or moved therewith.

Another object of the invention is to provide means for yieldingly holding the cultivator feet carrying bars in their proper operative positions and to return the same to their proper positions upon encountering an obstruction.

With these and other objects in view, the invention consists of the novel features of construction and the combination and arrangement of parts hereinafter fully described and claimed, and illustrated in the accompanying drawings, in which—

Figure 1 is a side elevation of a portion of a cultivator illustrating the preferred embodiment of my invention; Fig. 2 is a section taken on the line 2—2 of Fig. 1; Fig. 3 is a detail section taken on the line 3—3 of Fig. 1; Fig. 4 is a detail perspective view of one of the cultivator bars; and Fig. 5 is a fragmentary perspective view of the frame and guide.

Referring more particularly to the drawings 5 indicates the vertically adjustable wheel supported frame to which the cultivator bars are connected. This frame is more particularly shown and described in the application above referred to and will not be set forth in detail. It will suffice to state that this frame is adjusted by means of a lever 6 connected by a link rod 7.

A plurality of cultivator bars 8 extend rearwardly from the vertically adjustable frame 5. Each of these bars carry a plurality of cultivating feet 9, to which the blades 10 are secured. The cultivator feet would preferably be adjustably mounted upon the bars 8 and any preferred means may be provided for securing this adjustment, the same comprising no part of the present invention.

Upon the frame 5 a transverse shaft 18 is mounted in the bearings 19. Levers 20 are rotatably mounted on said shaft and to the ends of said levers the springs 21 are connected at one of their ends, the other ends of said springs being secured to the cultivator bars. It will be observed from reference to Fig. 2 that the springs 21 extend directly above or in the same vertical plane with the bars 8 and as the lever is adjusted, the tension of these springs may be increased or decreased. The levers carry the usual dogs for engagement with the rack segments 22 to hold the same in their adjusted positions.

Substantially U-shaped rock shafts 23 are mounted upon the adjustable frame 5 and upon the intermediate portions of the shafts blocks 24 are mounted to oscillate. The forward ends of the cultivator bars 8 are pivotally connected to the blocks 24 by means of the plates 25 whereby the cultivator bars may have transverse movement. Upon the shaft 18 carried by the frame 5, a lever 26 is rotatably mounted. This lever is preferably arranged centrally on the shaft and a plurality of link rods 28 connect one end of the same with the cultivator bars 8. A rack segment 28' is also provided with this lever to secure the same in its adjusted position.

In the practical operation of the machine, by adjusting the levers 20 the tension of the springs 21 may be regulated as desired. These springs are adapted to maintain the plow feet in yielding contact with the ground as the machine moves over the same and upon the plow feet striking a stone or other obstruction and being deflected thereby so as to move the bar 8 transversely upon the end of the block 24, the spring 20 will immediately return the cultivator bar to its normal position after passing such obstruction. When the frame 5 is vertically moved by the manipulation of the lever 6, the cultivator bars are also elevated as they are carried by said frame and the cultivating blades 10 thus disengaged from the ground when desired by the operator. The cultivator bars may be simultaneously elevated by adjusting the central lever 26, so that the cultivators may be quickly thrown out of operation without altering the position of the vertically movable frame 5.

From the foregoing it will be seen that I have devised a very simple and efficient cultivator which is admirably adapted for use in the preparation of the soil for planting purposes. It may, however, be used for the cultivation of the plants at different periods of their growth. The cultivators may be easily and quickly adjusted and are always held yieldingly in their proper operative positions whereby the best results are secured. While I have shown and described the preferred embodiment of the invention, it will be obvious that the same may be variously modified without departing from the essential features of sacrificing any of the advantages of the same.

Having thus described the invention what is claimed is:

1. In a machine of the character described, the combination with a vertically slidable frame and guides therefor, of a plurality of cultivator bars having one of their ends connected to the frame, means for simultaneously raising and lowering the frame and the cultivator bars, and means for elevating said bars independently of the frame.

2. In a machine of the character described, the combination with wheel supported guides, a frame vertically slidable in said guides, of a plurality of cultivator bars pivotally supported at one of their ends by said frame, means for raising and lowering said frame and bars, and means arranged on the frame and connected to the cultivator bars whereby said bars may be elevated independently of the frame.

3. In a machine of the character described, the combination with a vertically movable frame, oscillatory blocks carried by said frame, cultivator bars pivoted on said blocks for transverse movement, means yieldingly holding said cultivator bars in alinement with the blocks and in their normal operative positions, means for simultaneously raising and lowering the frame and the bars and means for independently elevating said cultivator bars to an inoperative position.

4. In a machine of the character described, the combination with a vertically movable frame, of U-shaped shafts secured to the frame, an oscillatory block mounted on each of the shafts, a cultivator bar pivoted to one end of each of said blocks for transverse movement, levers mounted on the frame, springs connecting said levers and the cultivator bars to yieldingly maintain the cultivator bars in alinement with the blocks, means for simultaneously raising and lowering the frame and bars, and means for moving said bars to an inoperative position independently of the frame.

5. In a machine of the character described, the combination with a vertically movable frame, of U-shaped shafts carried by said frame, an oscillatory block mounted on each of the shafts, a cultivator bar pivoted upon each block for transverse movement, a transverse shaft mounted on the frame, adjusting levers rotatably mounted on the shaft, springs connecting said levers and cultivator bars to yieldingly maintain said bars in their operative positions, means for simultaneously elevating the frame and bars and another lever mounted on said transverse shaft and connected to said cultivator bars to elevate the same independently of the frame.

In testimony whereof I hereunto affix my signature in the presence of two witnesses.

EWELL MONROE DOWDY.

Witnesses:
W. S. ARMSTRONG,
J. G. COOPER.